US011643349B2

(12) United States Patent
Heinen (10) Patent No.: US 11,643,349 B2
(45) Date of Patent: May 9, 2023

(54) WASTEWATER TREATMENT SYSTEM AND PROCESS

(71) Applicant: ALFA LAVAL CORPORATE AB, Lund (SE)

(72) Inventor: Nicolas Heinen, Kgs. Lyngby (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 17/842,405

(22) Filed: Jun. 16, 2022

(65) Prior Publication Data

US 2022/0315466 A1    Oct. 6, 2022

Related U.S. Application Data

(62) Division of application No. 16/969,366, filed as application No. PCT/EP2019/051089 on Jan. 17, 2019, now Pat. No. 11,453,605.

(30) Foreign Application Priority Data

Feb. 14, 2018    (EP) .................................... 18156713

(51) Int. Cl.
    *C02F 3/30*      (2023.01)
    *C02F 3/12*      (2023.01)
    *C02F 101/16*    (2006.01)

(52) U.S. Cl.
    CPC ............ *C02F 3/302* (2013.01); *C02F 3/1263* (2013.01); *C02F 3/1268* (2013.01); *C02F 2101/16* (2013.01); *C02F 2203/006* (2013.01); *C02F 2209/40* (2013.01)

(58) Field of Classification Search
    CPC ...... C02F 3/302; C02F 3/1263; C02F 3/1268; C02F 2101/16; C02F 2203/006; C02F 2209/40; C02F 3/307; C02F 2209/14; C02F 3/12; C02F 3/30; Y02W 10/10
    USPC ........................................................ 210/605
    See application file for complete search history.

(56) References Cited

U.S. PATENT DOCUMENTS

| | | | |
|---|---|---|---|
| 3,423,077 | A | 1/1969 | Gloppen |
| 6,290,849 | B1 | 9/2001 | Rykaer et al. |
| 7,147,777 | B1 | 12/2006 | Porteous |
| 7,147,778 | B1 | 12/2006 | DiMassimo et al. |
| 2014/0138308 | A1 | 5/2014 | Elger et al. |

(Continued)

FOREIGN PATENT DOCUMENTS

| | | |
|---|---|---|
| CN | 203582648 U | 5/2014 |
| CN | 104528934 B | 4/2016 |
| CN | 105016561 B | 1/2017 |

(Continued)

OTHER PUBLICATIONS

"Design and Build", A Host of Latest Water Technologies, TriTech, URL: https://www.tritechwater.com.sg/design-and-build 2013, pp. 1-3.

(Continued)

*Primary Examiner* — Nam X Nguyen
*Assistant Examiner* — Ekandra S. Miller-Cruz
(74) *Attorney, Agent, or Firm* — Birch, Stewart, Kolasch & Birch, LLP (57) ABSTRACT

A wastewater treatment system and a wastewater treatment process, fluidly combining a one or more SBR (sequencing batch reactor) module/s, in which nitrification and denitrification of the wastewater are performed in sequences and one or more MBR (membrane bioreactor) module/s.

11 Claims, 8 Drawing Sheets

(56) References Cited

U.S. PATENT DOCUMENTS

2014/0263041 A1    9/2014  Regmi et al.

FOREIGN PATENT DOCUMENTS

| | | |
|---|---|---|
| EP | 0 828 692 A1 | 3/1998 |
| RU | 2 584 574 C1 | 5/2016 |
| RU | 2 640 767 C2 | 1/2018 |
| WO | WO 96/35644 A1 | 11/1996 |
| WO | WO 2007/120934 A2 | 10/2007 |
| WO | WO 2007/120934 A3 | 10/2007 |

OTHER PUBLICATIONS

English Translation of Russian Office Action and Search Report for Russian Application No. 2020129828, dated Mar. 5, 2021.

Gangavarapu et al., "Membrane Bioreactor Coupled with Sequential Batch Reactor: A Supportive Technology in Effluent Recycling of API Manufacturing Industries", International Journal of New Technology and Research (IJNTR), ISSN: 2454-4116, vol. 1, Issue 3, Jul. 2015, pp. 46-49.

International Preliminary Report on Patentability issued in PCT/EP2019/051089 (PCT/IPEA/409), dated Apr. 23, 2020.

International Search Report issued in PCT/EP2019/051089 (PCT/ISA/210), dated Mar. 14, 2019.

Johnson, "Evolution of Sequencing Batch Reactor-Membrane Bioreactor Technology", SBR-MBR, Membranes a Supplement to WaterWorld, 2009, pp. 1-3.

Written Opinion of the International Preliminary Examining Authority issued in PCT/EP2019/051089 (PCT/IPEA/408), dated Feb. 5, 2020.

Written Opinion of the International Searching Authority issued in PCT/EP2019/051089 (PCT/ISA/237), dated Mar. 14, 2019.

WASTEWATER TREATMENT SYSTEM AND PROCESS

CROSS-REFERENCE TO RELATED APPLICATIONS

This application is a Divisional of copending application Ser. No. 16/969,366, filed on Aug. 12, 2020, which is the National Phase application of PCT/EP2019/051089, filed on Jan. 17, 2019, which claims priority under 35 U.S.C. § 119(a) to application Ser. No. 18/156,713.2, filed in the European Patent Office on Feb. 14, 2018, all of which are hereby expressly incorporated by reference into the present application.

AREA OF INVENTION

The current invention relates to treatment of sewage and/or wastewater. The wastewater treatment system of the current invention combines a SBR (sequencing batch reactor) in which nitrification and denitrification of waste water are performed in sequences and a module for MBR (membrane bioreactor), which is fluidly connected to the SBR.

BACKGROUND OF INVENTION AND PRIOR ART

Sewage and/or wastewater contains contaminants that are often classified into organic matters and nitrogen and/or phosphorous nutrient salts. When wastewater containing high levels of nutrient phosphor and/or nitrogen salts is released into the environment, eutrophication can/will happen. The present invention discloses a wastewater treatment system, a wastewater treatment plant and a method of operating the wastewater treatment system and/or plant. The wastewater system combines a SBR and MBR. During the SBR and MBR process, the organic nitrogen and/or ammoniacal nitrogen in the wastewater first goes through anoxic nitrification into nitrate nitrogen and then though anaerobic denitrification into nitrogen gas within the SBR tank. After the SBR treatment (and removal of organic nitrogen and/or ammoniacal nitrogen) the wastewater is treated by a biomass in the MBR tank, that uses a biological reaction utilizing oxygen, for decomposing and thereby removing remaining organic matter from the wastewater.

The process within the SBR (sequencing batch reactor) is a fill and draw activated sludge process for nitrification. It is commonly used in wastewater treatment due to operational flexibility and process control possibilities. The wastewater enters partially filled SBR and once the reactor is full, it behaves like a conventional activated sludge system, but without continuous influent or effluent flow.

The SBR is a two-phase system. First phase is a nitrification process, converting ammonium ($NH_4^+$) or ammonia ($NH_3$) into nitrate ($NO_3^-$). The nitrification phase has two steps. The first step is a nitrification phase (N) where ammonium ($NH_4^+$) or ammonia ($NH_3$) is oxidized to nitrite ($NO_2$) by an AOB bacteria (ammonia oxidizing bacteria):

$$NH_4^+ + \tfrac{3}{2}O_2 \rightarrow NO_2^- + H_2O$$

The second step is oxidization of nitrite ($NO_2^-$) to nitrate ($NO_3^-$) by NOB bacteria (nitrite-oxidizing bacteria):

$$NO_2^- + \tfrac{1}{2}O_2 \rightarrow NO_3^-$$

The second phase in the SBR is the denitrification process or the anoxic phase, where denitrifying bacteria converts nitrate to molecular nitrogen ($N_2$) through a series of intermediate gaseous nitrogen oxide products:

$$2NO_3^- + C \rightarrow 2NO_2^- + CO_2$$

$$2NO_2^- + C \rightarrow 2NO + CO_2$$

$$2NO + C \rightarrow CO_2 + N_2$$

EP0828692 discloses a wastewater treatment system where the nitrification and the denitrification are taking place simultaneously within the same system, it does however not disclose a system where the MBR and the SBR are combined. CN104528934 (Tsinghua Univ.), discloses a short-range nitrification-denitrification membrane bioreactor divided into multi-stage connected reaction chambers having anoxic and aerobic zones divided adjustable fold wall. By adjusting the fold wall between chambers, a flow between anoxic and aerobic zones can be achieved, but the document does not disclose the combination of SBR and MBR, nor the re-use or re-flow between those disclosed in the present invention. CN203582648U (Wuxei Bomei), describes a combined SBR and MBR sewage treatment facility. However, even though the SBR and MBR are built in one unit, they are not hydraulic connected and act as separate units with separate flow within one system.

The MBR (Membrane bioreactor), is a modern wastewater treatment technology. It combines membrane separation technology and bioorganic wastewater treatment technology. By utilizing membrane, MBR separates the activated sludge and other biological or organic matter in wastewater. MBR process is called as a hybrid system, as it works with biological treatment in conjunction with separation. Operation of MBR with combination with an activated sludge system such as SBR produces high quality treated effluent (*International Journal of New Technology and Research (IJNTR) ISSN: 2454-4116, Volume-1, Issue-3, July 2015 Pages 46-49*) and is commonly referred to as a sequencing batch membrane bioreactor. A conventional sequencing bath membrane bioreactor receives and treats wastewater in batches. Different treatment steps, including supply of wastewater and discharge of treated wastewater, are performed in batches, not in in a constant flow.

In the SBR, nitrification and denitrification of waste water are performed in sequences and the MBR cells are fluidly connected to the SBR. In MBR air scouring is used for controlling membrane fouling and oxygen content in the MBR cells is kept at a high level. It is therefore important that any flow or return sludge from the MBR into the SBR only takes place during the nitrification phase and not in denitrification phase. Furthermore, by returning the oxygen rich sludge from the MBR into the SBR system, the dissolved oxygen can be utilized for nitrification in the SBR.

Figure 1:
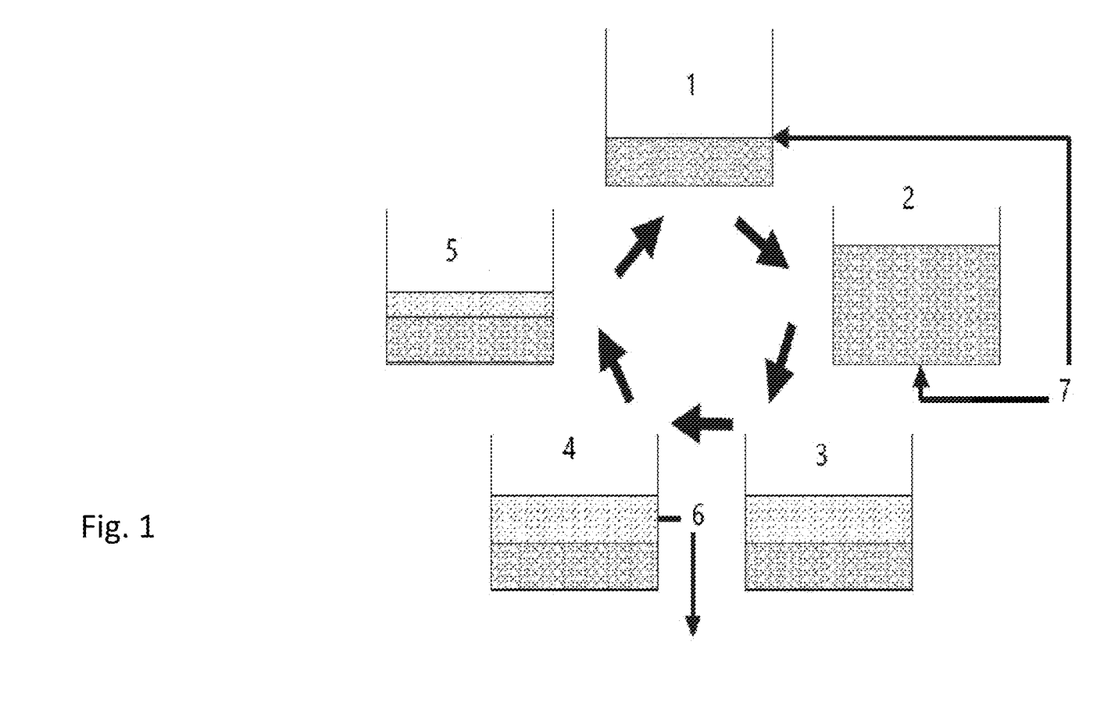
FIG. 1 illustrates the flow steps of a prior art SBR

As shown in FIG. 1, picturing prior art, SBR reactor tank/tanks go through following five steps, in a discontinuous process, where water level is changing throughout the process:

1. Fill—the SBR tank is filled with wastewater to be cleaned.
2. React—the biological process described above takes place
3. Settle—sludge generated during the biological process settles in the bottom of the SBR tank
4. Draw—the clarified effluent is discharged from the SBR tank
5. Idle—in this phase any extraction of sludge takes place Further to FIG. 1, a decant pipe 6 is shown, for the flow of effluent from the SBR tank and an aeration and/or mixing device 7.

Those stages can take place in one, two or more SBR reactor tanks. Double/triple ditch as well as Unitank® (a trademark registered wastewater solution designed and produced by the Belgian company Seghers) can also be considered as sequence batch with the difference that tank is hydraulically connected giving a better use of tank volume.

As mentioned above there are benefits in the combination of a SBR and a MBR, in the form of the quality of the effluent produced. Even further advantages in the combination of MBR and SBR are savings in tank volume, elimination of the need for a deoxidation zone and decrease in sludge return. However, the combination of the MBR technology with SBR has always been considered being difficult due to the fact that process is sequenced into steps (as explained above and in Drawing 1) with difference within liquid level within the SBR tank, while the MBR technology is a continuous separation process, with stable liquid level.

SUMMARY OF INVENTION

The object of the present invention is to overcome the problem of different flow systems within SBR and MBR when they are hydraulically connected. Surprisingly this has been solved by the present invention by dividing the SBR tank into two tanks, with a hydraulic connection between tank for a better use of tank volume. The divided SBR tank is then hydraulically connected to the MBR part of the system by a distribution channel. The distribution channel that connects the MBR and the SBR brings return sludge from the MBR into the half-part of the SBR that is in a nitrification phase. The present invention therefore discloses a solution where a divided SBR system is connected to a MBR system and the whole system runs a continuous process with an optimal use of oxygen from return sludge, optimal energy utilization and an optimal utilization of both the SBR and the MBR in the system. Further advantage is that prior art MBR plant construction will normally require a deoxidation zone in front of the SBR system, but as any dissolved oxygen in pretreated wastewater entering the SBR-MBR system of the present invention, will be utilized within the rotating nitrification/denitrification of the SBR part, such a deoxidation zone is not needed.

Further aspects of the invention are apparent from the dependent claims and the description.

BRIEF DESCRIPTION OF THE DRAWINGS

Further objects, features and advantages will appear from the following detailed description of several embodiments of the invention with reference to the drawings, in which.

DETAILED DESCRIPTION OF INVENTION

Figure 2:
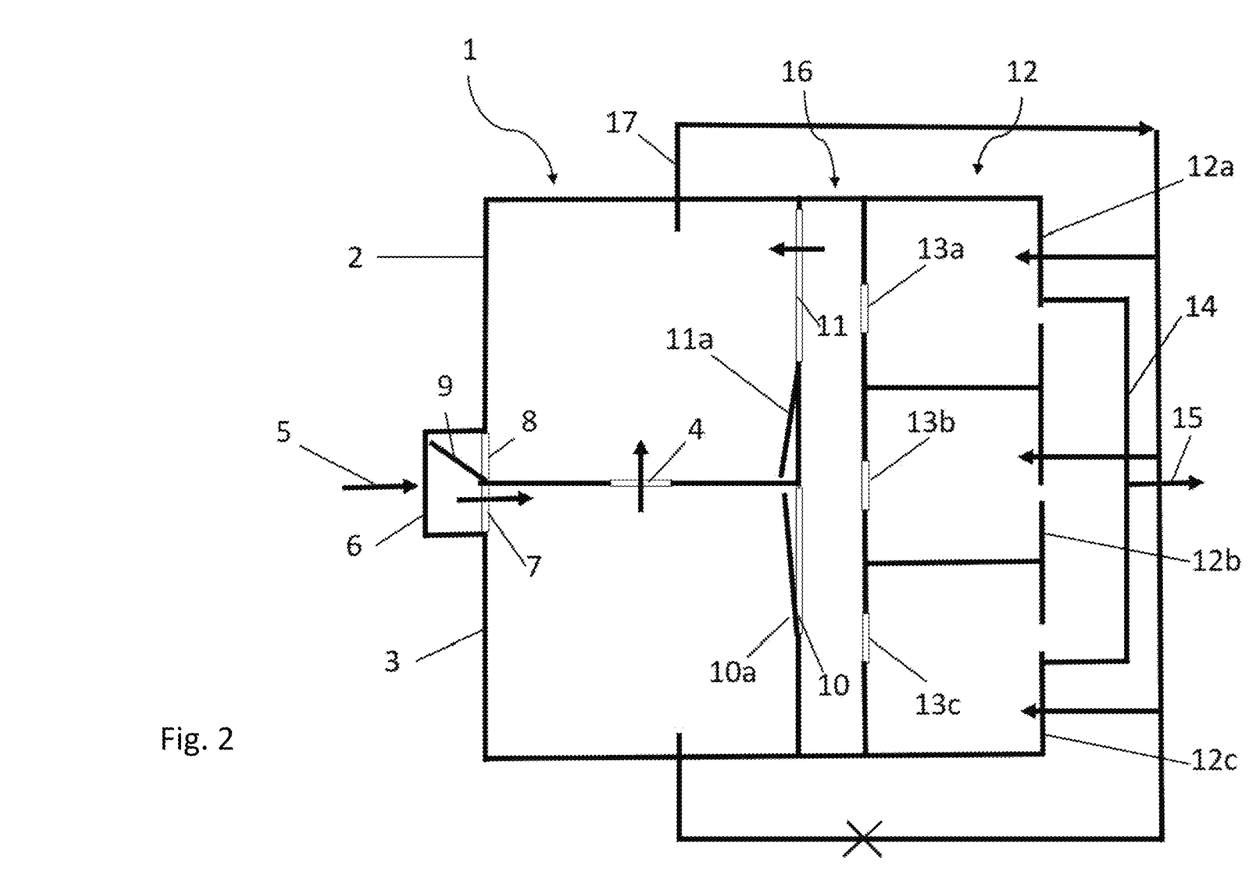
FIG. 2. shows the combined system of SBR and MBR in phase-1 of the system

With reference to FIG. 2, a wastewater treatment system comprising a SBR 1, a MBR 12 and MBR channel 16 that hydraulically connects the SBR 1 and MBR 12, is shown. The SBR 1 comprises two tanks, tank-A 2 and tank-B 3, that are in hydraulic connection through opening 4. Both tank-A 2 and tank-B 3 are in hydraulic connection with MBR channel 16, tank-A 2 though weir 11 and tank-B through weir 10. Weir 11 and weir 10 from SBR 1 into the MBR channel 16, can be closed by closing mechanism 11a and 10a. The SBR 1 is furthermore in hydraulic connection with a wastewater inlet pipe 5, through inlet housing 6. Tank-A 2 is in a hydraulic connection with inlet housing 6 through opening 8 and tank-B is in hydraulic connection with inlet housing 6 though opening 7. A controlling mechanism 9 controls the flow from inlet pipe 5 through either opening 7 or opening 8 into the SBR 1. The MBR 12, in this embodiment, contains 3 chambers 12a, 12b and 12c, that are in hydraulic connection to the MBR channel 16 through openings 13a, 13b and 13c. A recyclization pipe 17 connects both tank-A 2 and tank-B 3 to the MBR system 12, which in this embodiment comprises three chambers 12a, 12b and 12c. The MBR system 12 has an outlet 14 in hydraulic connection with all chambers, in this embodiment the three chambers 12a, 12b and 12c, and with an outlet pipe 15.

In phase-1, as shown in FIG. 2, tank-B 3 is in denitrification while tank-A 2 is in nitrification. In phase-1, the controlling mechanism 9 closes of opening 8 into tank-A 2. Therefore, pretreated wastewater (feed flow) flows through the inlet pipe 5 and through opening 7 into tank-B 3 for denitrification. Weir 10 from MBR channel 13 into tank-B 3 is closed with closing mechanism 10a. An equivalent flow to the feed flow is going to tank-A 2 from tank-B 3 through opening 4 on the wall separating the two tanks (tank-A 2 and tank-B 3). During phase-1, the ammonia concentration is slightly increasing and nitrate is decreasing in tank-B 3. In tank-A the ammonia level will decrease and nitrate will slightly increase during phase1. The length of phase-1 can be controlled, by utilizing a nitrate sensor in tank-B 3. Meanwhile during phase-1, tank-A 2 is in hydraulic connection with MBR channel 16 through weir 11, bringing back activated sludge from the MBR 12 into tank-A 2. The activated sludge will contain dissolved oxygen, estimated to be between 4-6 mg/l. The length of phase-1 can also be controlled by utilizing an ammonia sensor into tank-A 2. During phase-1, Tank-A 2 is in direct hydraulic connection with the MBR 12, though recyclization pipe 17.

Figure 3:
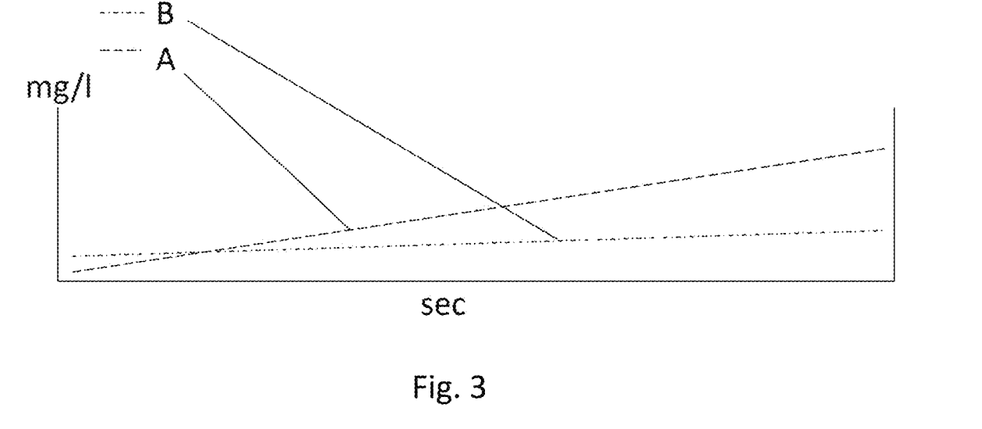
FIG. 3. shows the changes in nitrate and ammonia in SBR tank-A during nitrification in phase-1 in one embodiment of present invention FIG. 4. shows the changes in nitrate and ammonia in SBR tank-B during denitrification in phase-1 in one embodiment of present invention FIG. 5. shows the combined system of SBR and MBR in phase2 (mixed-phase) of the system FIG. 6. shows the changes in nitrate and ammonia in SBR tank-A during nitrification in phase2 (mixed-phase) in one embodiment of present invention FIG. 7. shows the changes in nitrate and ammonia in SBR tank-B during denitrification in phase2 (mixed-phase) in one embodiment of present invention FIG. 8. shows the combined system of SBR and MBR in phase3 of the system FIG. 9. shows the combined system of SBR and MBR in phase-4 (mixed-phase) of the system FIG. 10 show a schematic 3-D drawing of the combined SBR and MBR system
Figure 4:
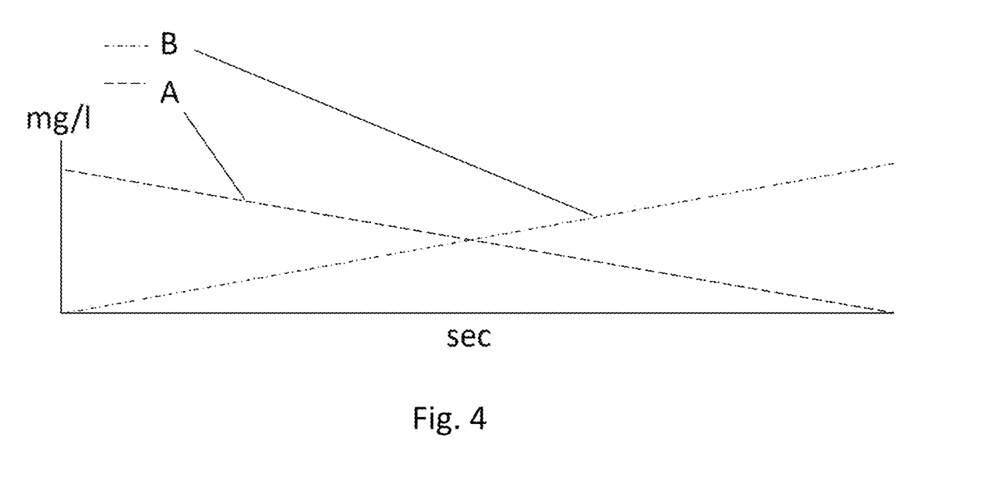

FIG. 3 demonstrates the changes in concentration of ammonium ($NH_4^+$) and/or ammonia ($NH_3$) and nitrate ($NO_2$) during the nitrification process in tank-A 2 during phase-1 in one embodiment of the present invention. As can be seen from FIG. 3., line B, the start concentration of ammonium and/or ammonia in tank-A 2 is low, as the tank is coming from nitrification phase (phase-4). During phase-1 tank-A is receiving steady flow from tank-B 3 that is in denitrification phase, through opening 4, keeping the ammonium and/or ammonia concentration in tank-A 2 low throughout phase1. However, as tank-A 2 is in nitrification, the concentration of nitrate ($NO_2$), line A in FIG. 3., will rise throughout phase1. FIG. 4., demonstrates the changes in concentration of ammonium and/or ammonia and nitrate during the denitrification process of tank-B 3 in phase-1 in one embodiment of the present invention. As the weir 10 from tank-B 3 is closed during phase-1, the concentration of nitrate, shown as line A in FIG. 4, is high in the beginning of phase1. However, during the denitrification phase in tank-B 3, steady flow of wastewater from inlet pipe 5 is entering tank-B 3 through opening 7, resulting in increasing concentration of ammonium and/or ammonia (line B) and decreasing concentration of nitrate (line A). The speed of the changes of concentration of nitrate (line A) and ammonium and/or ammonia (line B) of the embodiment of FIGS. 3. and 4., will rely on both the volume of tank-A 2 and tank-B 3 and the flowrate between the tanks through opening 4.

Figure 5:
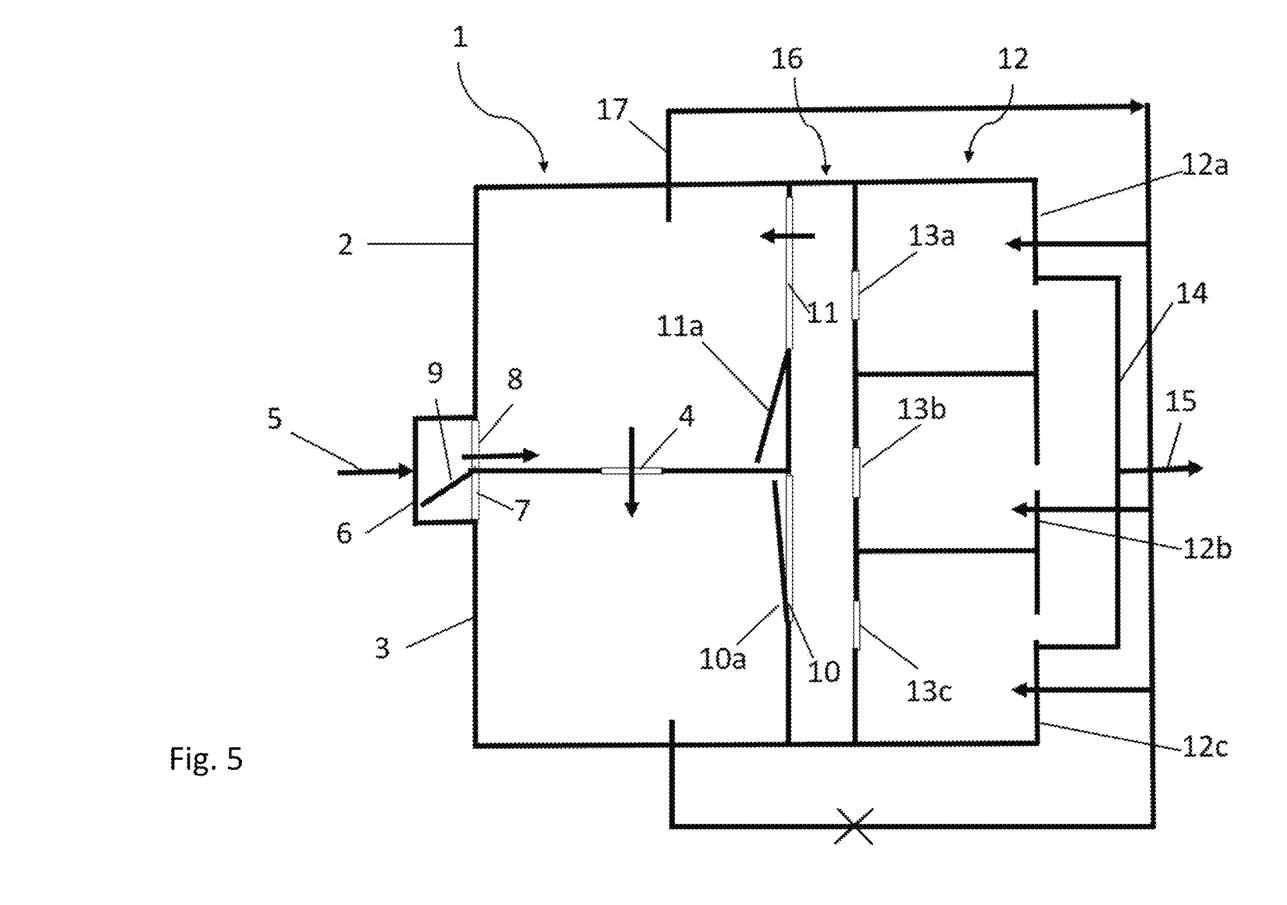

FIG. 5, discloses phase2 (mixed-phase) of a wastewater treatment system comprising a SBR 1, a MBR 12 and MBR channel 16 that hydraulically connects the SBR 1 and MBR 12. Both tank-A 2 and tank-B 3 of the SBR 1 are either in nitrification phase during phase2 or they can both be in a DO-phase (double-phase), where denitrification and nitrification takes place in parallel and simultaneously within the tank. In phase-2, the pretreated wastewater (feed flow) flows through the inlet pipe 5 and through opening 8 into tank-A 2. Weir 10 from tank-B 3 to MBR channel 16 is still closed while weir 11 from tank-A 2 to MBR channel 16 is open. If tank-A 2 is in a DO-phase both ammonium ($NH_4^+$) and/or ammonia ($NH_3$) and nitrate will decrease within tank-A during phase-2, and remaining ammonium and/or ammonia will be oxidized into nitrate in the MBR.

Figure 6:
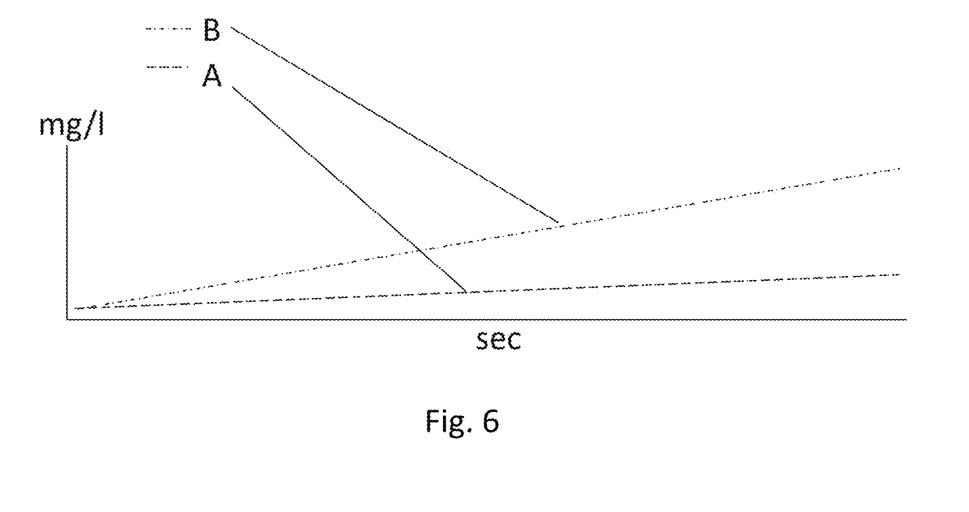

FIG. 6, demonstrates the changes in concentration of ammonium and/or ammonia and nitrate during either nitrification phase or DO-phase of tank-A 2 during phase-2, in one embodiment of the present invention. As demonstrated in FIG. 6., the ammonia and/or ammonium concentration (line B) in tank-A 2 is low in the beginning of phase-2, as the tank is coming from nitrification phase (phase-1 of present invention). During phase-2, the pretreated wastewater flows through opening 8 into tank-A, keeping the concentration of ammonia and/or ammonium low throughout phase2 (line B). During phase-2, the concentration of nitrate (line A) in tank-A will rise, as demonstrated by line A of FIG. 6.

Figure 7:
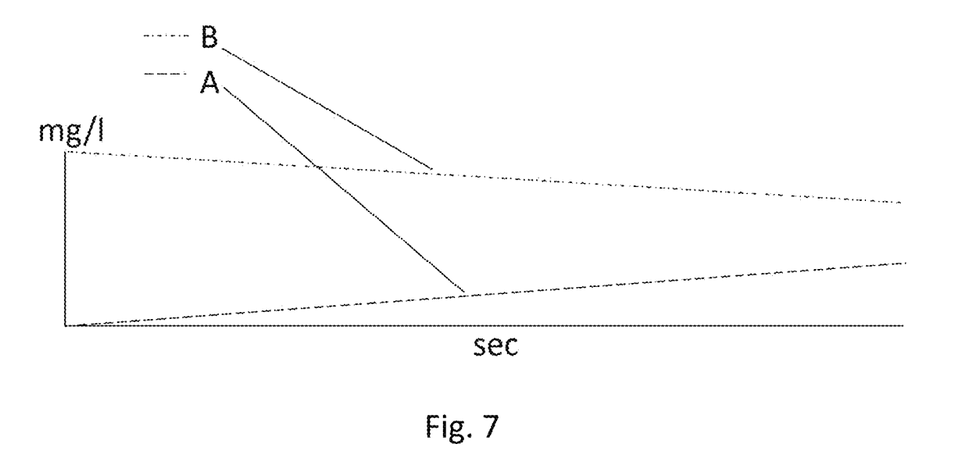

In FIG. 7., the concentration of ammonium and/or ammonia and nitrate in one embodiment of the present invention, during either nitrification phase or DO-phase of tank-B 3 during phase-2, is shown. The weir 10 of tank-B 3 into the MBR channel from the MBR 12 is closed in phase-2, and as tank-B 3 is coming from the denitrification phase of phase-1, the ammonium and/or ammonia concentration of tank-B is high in the start of phase2 (line B). During phase-2, steady flow of ammonia and/or ammonium is steady into tank-A (2), and from tank-A 2 into tank-B 3. This results in either nitrification phase or DO-phase, during which nitrification of ammonium and ammonia into nitrate will take place, as demonstrated by the increased concentration of nitrate, line B of FIG. 7.

Figure 8:
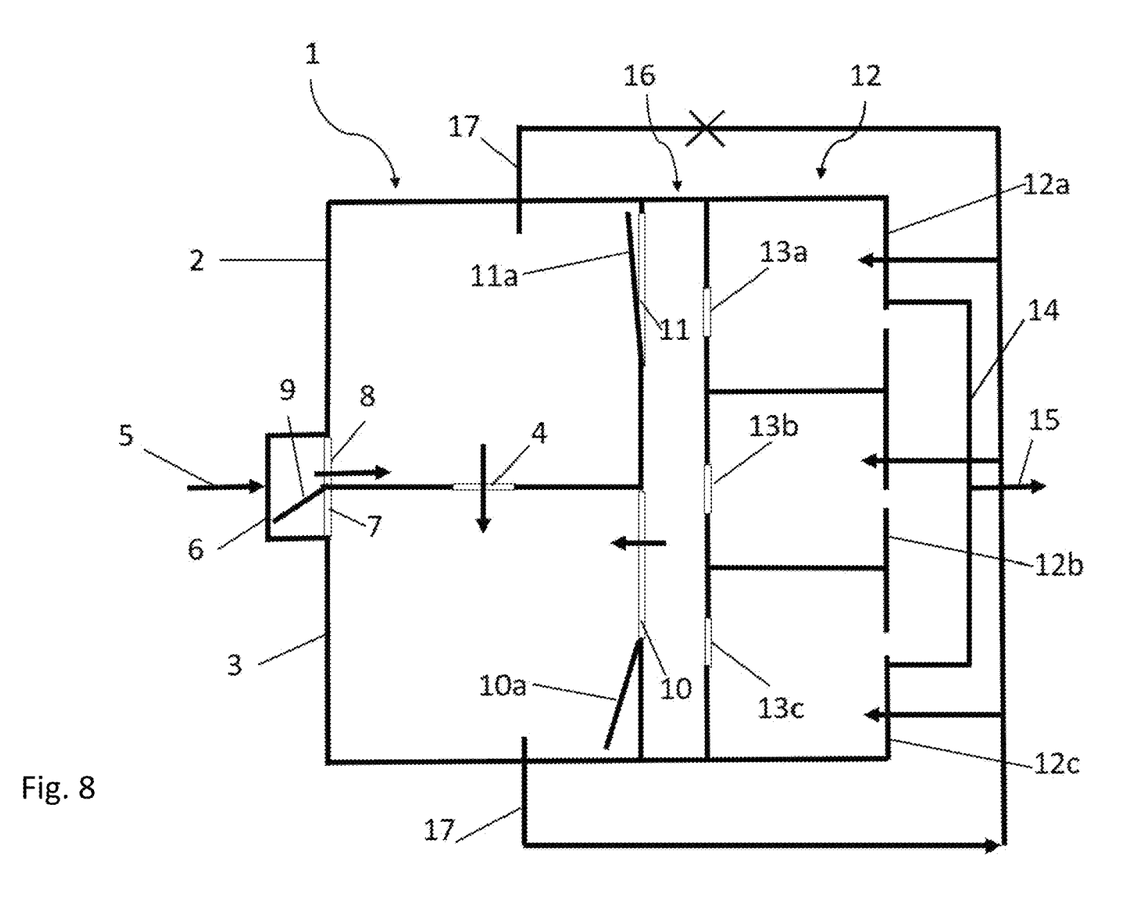

FIG. 8, discloses phase3 of a wastewater treatment system comprising a SBR 1, a MBR 12 and MBR channel 16 that hydraulically connects the SBR 1 and MBR 12. In phase-3, tank-B 3 of MBR 12 is in nitrification phase, while tank-A 2 is in denitrification phase. In phase-3, the pretreated wastewater (feed flow) flows through the inlet pipe 5 and through opening 8 into tank-A 2 for denitrification. The weir 11 from MBR channel 16 into tank-A 2 is closed by closing mechanism 11a. A flow, equivalent to the feed flow, is going through opening 4, from tank-A 2 into tank-B 3. During phase-3, the ammonia and/or ammonium concentration in tank-A 2 is slightly increasing and the nitrate concentration decreasing. The length of phase3 can be controlled by installing a nitrate sensor in tank-A 2. In tank-B 3, the concentration of ammonia and/or ammonium will decrease while concentration of nitrate will slightly increase. In phase3 weir 10 into tank-B 3, from MBR channel 16 is open, so activated sludge containing dissolved oxygen will enter tank-B 2. Again, if an ammonia sensor is installed, the length of phase3 can be controlled. During phase-3, recirculation through recirculation pipe 17 from tank-B 3 (in nitration) to all three MBR chambers 12a, 12b and 12c is open. Meanwhile recirculation from tank-A 2 (in denitrification) through pipe 17 is closed.

It should be noted that phase3 is equivalent to phase-1, though with inverted tanks. This means that tank-A 2 in phase3 is equivalent to tank-B 3 in phase1 and tank-B 3 in phase3 is equivalent to tank-A 2 in phase1. Therefore FIG. 4, that demonstrates the changes in concentration of ammonia/ammonium and nitrate in tank-B 3 during phase1 of one possible embodiment of the invention, further demonstrates the same changes in tank-A 2 during phase3. Furthermore FIG. 3, that demonstrates the changes in concentration of ammonia/ammonium and nitrate in tank-A 2 during phase1 of one possible embodiment of the invention, further demonstrates concentration changes in tank-B 3 during phase-3.

Figure 9:
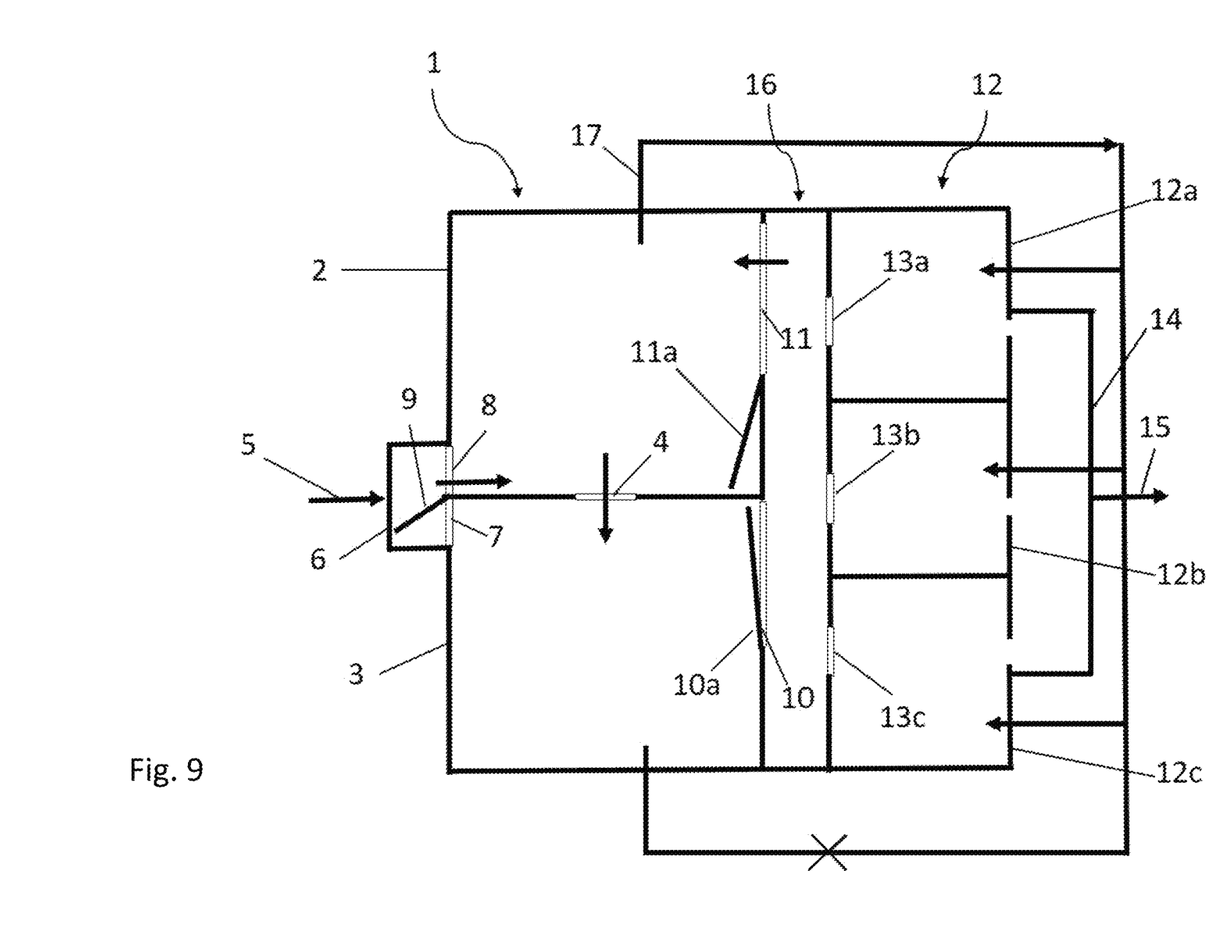

FIG. 9, discloses phase-4 (mixed-phase) of a wastewater treatment system comprising a SBR 1, a MBR 12 and MBR channel 16 that hydraulically connects the SBR 1 and MBR 12. As in phase2 (FIG. 5) both tank-A 2 and tank-B 3 of the SBR 1 are either both in nitrification phase during phase-4 or they can both be in a DO-phase (double-phase), where denitrification and nitrification takes place in parallel and simultaneously within each tank. In phase-4, the pretreated wastewater (feed flow) flows through the inlet pipe 5 and through opening 8 into tank-A 2. Weir 10 from tank-B 3 to MBR channel 16 is still closed while weir 11 from tank-A 2 to MBR channel 16 is open. If tank-A 2 is in a DO-phase both ammonium and/or ammonia and nitrate will decrease within tank-A during phase-4 and any remaining ammonium and/or ammonia will be oxidized into nitrate in the MBR.

Here it should be noted that phase-4 is equivalent to phase-2, though with inverted tanks. This means that tank-A 2 in phase-4 is equivalent to tank-B 3 in phase2 and tank-B 3 in phase-4 is equivalent to tank-A 2 in phase2. Therefore FIG. 6, that demonstrates the changes in concentration of ammonia/ammonium and nitrate in tank-A-2 during phase2 of one possible embodiment of the invention, further demonstrates the same changes in tank-B 3 during phase-4. Furthermore FIG. 7, that demonstrates the changes in concentration of ammonia/ammonium and nitrate in tank-B 3 during phase2 of one possible embodiment of the invention, further demonstrates concentration changes in tank-A 2 during phase-4.

Figure 10:
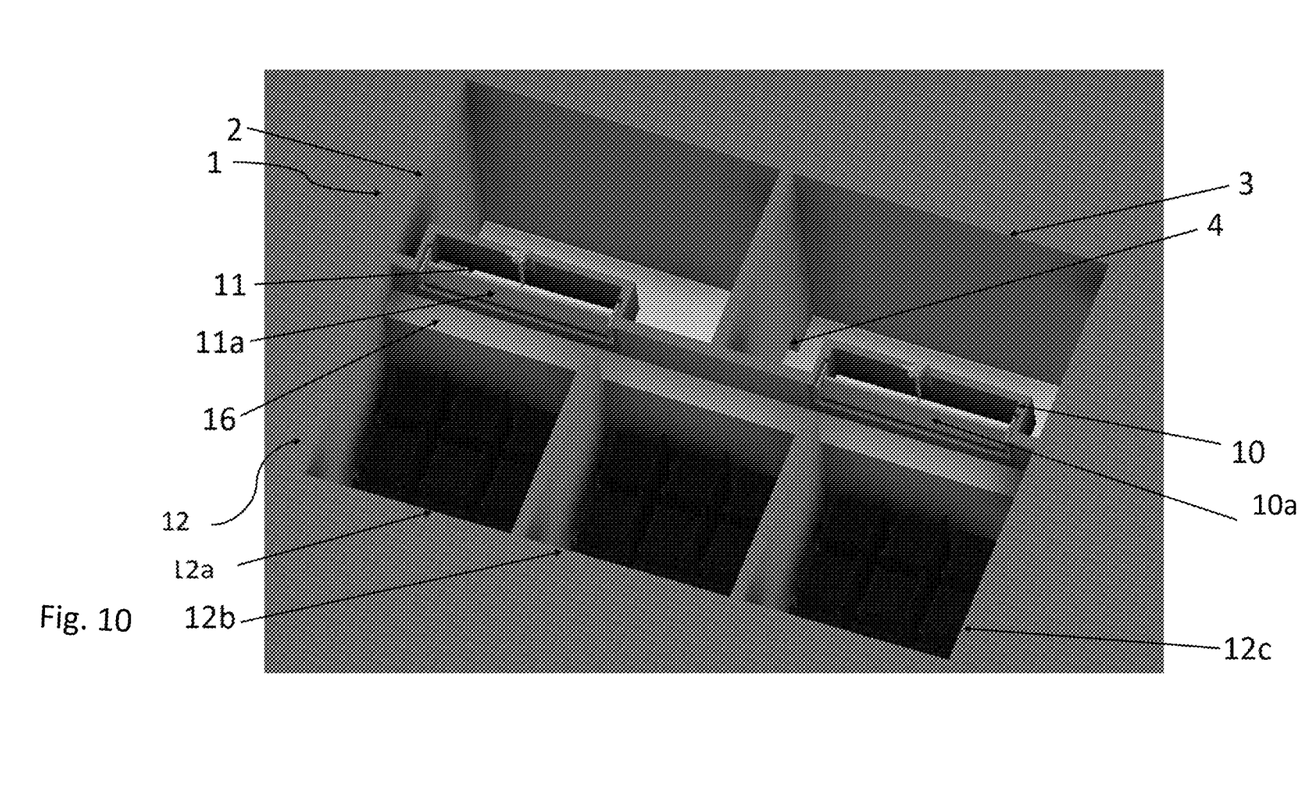

FIG. 10 discloses a wastewater treatment system comprising a SBR 1, a MBR 12 and MBR channel 16 that hydraulically connects the SBR 1 and MBR 12. The SBR 1 comprises two tanks, tank-A 2 and tank-B 3, that are in hydraulic connection through opening 4. Both tank-A 2 and tank-B 3 are in hydraulic connection with MBR channel 16, tank-A 2 through weir 11 and tank-B through weir 10. Weir 11 and weir 10 from SBR into the MBR channel 16, can be closed by closing mechanism 11a and 10a. The MBR 12, in this embodiment, contains 3 chambers 12a, 12b and 12c, that are in hydraulic connection to the MBR channel 16 through openings 13a, 13b and 13c (not shown).

In the present invention, the calculation for the biological process for either SBR or MBR configuration will not be different from prior art biological process calculation. The activity of the biological bacteria in either SBR or MBR is not influenced by the design or configuration of wastewater treatment system. The amount of sludge (biological mixture of different strains of bacteria) necessary for nitrification, depends on sludge age and the temperature of the wastewater. The amount of sludge necessary for the denitrification process, depends on the chemical composition of the wastewater (including external carbon sources and total nitrogen) and the temperature of the wastewater.

With the combined SBR/MBR system of the current invention, the need for a settle-phase (as demonstrated by phase 3 in FIG. 1) is eliminated, as the MBR part of the system filtrates the water from the SBR in continuous flow.

One of the advantages of the present invention is the possibility of increasing the biomass concentration in the biological tanks from the prior art concentration of 4-5 g/l to concentration as high as 12 g/l. The increase of the biomass concentration will result in decrease in biological tank volume, and thereby saving of energy and space, compared to prior art SBR/MBR wastewater plant.

Another advantage of the present invention over prior art SBR/MBR wastewater plants, is the steady level of wastewater within the MBR part of the system. In prior art wastewater plant with a separate MBR, the wastewater level within the MBR tank will vary considerable, resulting in an insufficient utilization of the tank volume and the biomass within the tank. A saving in the range of 20 to 30% in MBR tank volume can be expected with the new configuration, and thereby considerable saving of energy and space, compared to prior art SBR/MBR wastewater plant.

Yet another advantage of the present invention over prior art SBR/MBR wastewater plants, is the direct and controllable hydraulic connection between the MBR tank to the SBR tanks. This hydraulic connection brings return sludge from the MBR tank(s) where aeration is taking place, only into the SBR tank(s) in nitrification, where the oxygen in the activated sludge can be utilized. This control of the activated return sludge and of dissolved oxygen, eliminates the need for the deoxidation tank for oxygen removal, that is needed in prior art. One further advantage of the control of the activated return sludge over prior art SBR/MBR wastewater plants, is the utilization of the oxygen in the activated return sludge from the MBR tank in the nitrification of the SBR tank. The activated return sludge has an oxygen content close to oxygen-saturation, and by controlling the return of the activated sludge so it enters only the SBR tanks in nitrification, the oxygen will be utilized during nitrification, resulting in energy savings as high as between 3 and 6%.

By introduction of a sedimentation phase within phase-2, for increased sludge concentration, yet another advantage over prior art will be gained. The increased sludge concentration will allow for reduced sludge return from the MBR tank, thereby resulting in savings of energy and volume.

Definitions

Activated sludge as used within this document, is a biological matter, comprising biomass of microorganism or floc, comprising mostly of bacteria and protozoa. Activated sludge, is used for removing organic matter from wastewater by a biological reaction involving oxygen. In biological tank oxygen will be added with aerators to overcome the need for biological degradation, endogenous respiration and nitrification.

In MBR scouring air will be used to reduce fouling on membrane resulting in sludge saturation with oxygen. Oxygen saturated sludge will be returned to nitrification phase.

Membrane bioreactor or MBR as referred to within this document, is a known modern wastewater treatment technology. It combines membrane separation technology and bioorganic wastewater treatment technology. MBR comprises activated sludge that is separated from any outlet by a membrane. Thereby, MBR separates the activated sludge and other biological or organic matter from the cleaned effluent coming out of the MBR. MBR process is called as a hybrid system, as it works with biological treatment in conjunction with separation.

Sequencing batch reactor or SBR as referred to within this document is a known modern industrial wastewater treatment technology. The process within the SBR (sequencing batch reactor) is a fill and draw activated sludge process for nitrification. It is commonly used in wastewater treatment due to operational flexibility and process control possibilities. The wastewater enters partially filled SBR and once the reactor is full, it behaves like a conventional activated sludge system, but without continuous influent or effluent flow. For further details of the chemical reaction and traditional stages/phases of SBR see above in this document.

Sludge as referred to within this document is a residual, semi-solid material that is produced as a by-product during sewage treatment of industrial or municipal wastewater.

Wastewater or sewage as referred to within this document is any water that has been affected by human use. Wastewater is "used water from any combination of domestic, industrial, commercial or agricultural activities, surface run-off or storm-water, and any sewer inflow or sewer infiltration". [1] Therefore, wastewater is a byproduct of domestic, industrial, commercial or agricultural activities. The characteristics of wastewater vary depending on the source. Types of wastewater include: domestic wastewater from households, municipal wastewater from communities (also called sewage) or industrial wastewater from industrial activities. Wastewater can contain physical, chemical and biological pollutants that will vary depending on the source of the wastewater.

Influent as referred to within this document is the flow in. That is the pre-treated wastewater that is flowing to the wastewater treatment system of the present invention.

Effluent as referred to within this document is the flow out, or the treated wastewater from the wastewater treatment system of the present invention that has been treated and is flowing out of the system.

Wastewater treatment as referred to within this document is the process of removing contaminants from wastewater. Physical, chemical, and biological processes are used to remove contaminants and produce treated wastewater or an effluent (outflowing of water to a receiving body of water) that can be returned to the water cycle with minimal impact on the environment.

Nitrification process as referred to within this document is a biological process, where microorganism oxidize ammonium ions to nitrate (as explained above in this document).

Denitrification process as referred to within this document is a microbial facilitated process where nitrate is reduced and ultimately produces molecular nitrogen ($N_2$) (as explained above in this document).

Biological volume as referred to within this document is the part of the wastewater treatment plant, wherein biological processes take pace.

DO-phase or double-phase, as referred to within this document is a phase sometimes also referred to as Simultaneous nitrification—denitrification (SNdN). It is a phase within a bioreactor (such as SBR) where microbial nitrification and denitrification takes place parallel and simultaneously within same container/bioreactor or tank.

Sedimentation phase as referred to within this document is a process where gravity is used to concentrate biological matter and other suspended solids from the wastewater, so they will accumulate at the bottom the container/tank.

Example 1

Example 1, discloses the calculation for wastewater treatment plant, utilizing the present invention.

Dimensions

Table 1 and 2 below list the flow through the wastewater treatment plant of the example. The amount of wastewater flowing into the plant are shown in table 1, that furthermore discloses the variation in flow, and the average/total amount of different pollutants.

TABLE 1

| Parameter | Unit | Value |
| --- | --- | --- |
| Daily flow | m3/day | 3300 |
| Dimensioning flow | m3/h | 160 |
| Max MBR flow | m3/h | 240 |
| Max flow biology | m3/h | 320 |
| Max flow screen | m3/h | 640 |
| $BOD_7$ | mg/l | 122 |
| COD | mg/l | 240 |
| Tot P | mg/l | 3 |
| Tot N | mg/l | 37 |
| SS | mg/l | 150 |
| $BOD_7$ | Kg/d | 400 |
| Tot P | Kg/d | 10 |
| Tot N | Kg/d | 125 |
| SS | Kg/d | 495 |

Comparable, the amount of treated wastewater, or effluent flowing from the plant after treatment in the system of the current invention is shown in table 2, below.

TABLE 2

| Parameter | Unit | Treatment level | Target treatment |
| --- | --- | --- | --- |
| $BOD_7$ | mg/l | 10 | <8 |
| Tot N | mg/l | 15 | <10 |
| $NH_4$—N | mg/l | — | <2 |
| Tot P | mg/l | 0.3 | <0.2 |

Calculations:

Daily Sludge Production:

The daily sludge production can be calculated by converting $BOD_7$ to $BOD_5$

400×0.85=340 kg/d (495×0.5)+(340×0.4)×1.0=421 kg/day

Calculation of the necessary sludge needed for efficient nitrification is giving following figures:

At 10 degrees Celsius:

10.14 days (421×10.14)=4.269 kg

At 7 degrees Celsius:

16.8 days (421×16.8)=7072.8 kg

Necessary sludge amount needed for denitrification:

The necessary sludge needed for denitrification can also be calculated. The amount sludge needed will depend on the amount of nitrate that will have to be denitrified, that in return depends on the total amount of N flowing into the wastewater treatment plant and acceptable levels of N in the effluent of the wastewater treatment plant:

Total $N$ to be denitrified=(Total $N$ in)−(total $N$ out)−(total $N$ in sludge).

Total $N$ 125 kg/d−Total $N$ outlet 26 kg/d (based on 8 mg/l)−Total $N$ in sludge 18 kg/d=Total $N$ to denitrify: 81 kg/d (here 90 kg/d will be used for safety reason).

Denitrification Rate:

Using the results from the calculation above, the denitrification rate for the wastewater within the wastewater treatment plant will be:

At 10 degrees Celsius:

Standard denitrification rate of municipal wastewater at 10 degrees Celsius=1.5 g N/kg MLVSS×h.

At 7 degrees Celsius:

Standard denitrification rate of municipal wastewater at 10 degrees Celsius=1.5 g N/kg MLVSS×h.

For getting the standard denitrification rate at 7 degrees Celsius, the value for 10 degrees Celsius is converted to lover temperature=$1.5 \times 1.112^{(6-10)}$. This gives the dentification rate at 7 degrees Celsius=1.09 g N/kg MLVSS×h.

Total amount of sludge needed in wastewater plant:

Again, utilizing the values in the calculations shown above, the total amount of sludge needed in the wastewater plant can be calculated.

At 10 degrees Celsius:

N Sludge 4.269 kg

DN Sludge 4000 kg

Total: 8.269 kg

At 7 degrees Celsius:

N sludge 7.072.8 kg

DN sludge 4.615 kg

Total: 11.688 kg

Therefore, the necessary volume for biological treatment with a sludge concentration of 8 gr/l will be 1.033 m3 at 10 degrees Celsius.

For safety reason the design will be made with a total biological volume of 1.200 m³. This is enough biological volume to remove N at temperature as low as 7° C. (1200 m3 at 9.74 gr/l; that will give 11.688 kg sludge).

MBR volume of the wastewater treatment plant of this example is 360 m³. If we consider that 1/3 of volume can be considered as biological volume we have at disposition 120 m³ more than a traditional wastewater treatment plant with separate MBR and SBR systems.

Here in this example, a design with a total biological volume of 1.200 m³ will be used. This is enough biological volume to remove N at temperature as low as 7° C. (1200 m3 at 9.74 gr/l; that will give 11.688 kg sludge).

As illustrated above, the additional biological volume resulting from the combined MBR/SBR system of the current invention, will give 10% extra capacity within the plant.

This additional capacity can be utilized for introduction sedimentation in the SBR tank. This would increase the sludge concentration in the bottom of the SBR tank, resulting in a higher sludge concentration in the tank and a decrease in recirculation rate of the return sludge. Another alternative is to reduce the total biological volume (SBR and MBR tanks) by 120 m³ (in a plant with the dimensions of this example). This means 10% savings in total biological volume.

Embodiments

The current invention, as explained in reference to the drawings is only one possible embodiment.

In one embodiment of the invention, a sedimentation phase is included within phase2 of the system. In another embodiment of the present invention, a sedimentation phase is included within phase2 of the system, resulting in a higher sludge concentration. In yet another embodiment of the present invention, a sedimentation phase is included within phase2 of the system, resulting in a higher sludge concentration and a decrease in return sludge flow from the SBR part of the system to the MBR part of the system.

In one embodiment of the invention, a sedimentation phase is included within phase-4 of the system. In another embodiment of the present invention, a sedimentation phase is included within phase-4 of the system, resulting in a higher sludge concentration. In yet another embodiment of the present invention, a sedimentation phase is included within phase-4 of the system, resulting in a higher sludge concentration and a decrease in return sludge flow from the SBR part of the system to the MBR part of the system. In one embodiment of the invention, a sedimentation phase is included within phase2 and phase-4 of the system. In another embodiment of the present invention, a sedimentation phase is included within phase2 and phase-4 of the system, resulting in a higher sludge concentration.

In one embodiment of the invention, a sedimentation phase is included within phase2 and/or phase-4 of the system. In another embodiment of the present invention, a sedimentation phase is included within phase2 and/or phase-4 of the system, resulting in a higher sludge concentration. In yet another embodiment of the present invention, a sedimentation phase is included within phase2 and/or phase-4 of the system, resulting in a higher sludge concentration and a decrease in return sludge flow from the SBR part of the system to the MBR part of the system.

In one embodiment of the invention, a sedimentation phase is included within either phase2 and/or phase-4 of the system. In another embodiment of the present invention, a sedimentation phase is included within either phase2 and/or phase-4 of the system, resulting in a higher sludge concentration. In yet another embodiment of the present invention, a sedimentation phase is included within either phase2 and/or phase-4 of the system, resulting in a higher sludge concentration and a decrease in return sludge flow from the SBR part of the system to the MBR part of the system.

The number of SBR and/or MBR tanks and/or number of membrane modules (MBR modules) within each MBR tank can vary within the combined MBR/SBR system of the present invention.

In one embodiment of the invention the combined MBR/SBR system comprises three SBR tanks. In another embodiment of the invention the combined MBR/SBR system comprises four SBR tanks. In yet another embodiment of the invention the combined MBR/SBR system comprises five or more SBR tanks.

In one embodiment of the invention the combined SBR/MBR system comprises one MBR tank. In another embodiment of the invention the combined SBR/MBR system comprises two MBR tanks. In yet another embodiment of the invention the combined SBR/MBR system comprises four MBR tanks. In one embodiment of the invention the combined SBR/MBR system comprises five or more MBR tanks.

In one embodiment of the invention the combined SBR/MBR system each MBR tank comprises one MBR module. In another embodiment of the invention the combined SBR/MBR system each MBR tank comprises two MBR modules. In yet another embodiment of the invention the combined SBR/MBR system, each MBR tank comprises three MBR modules. In one embodiment of the invention the combined SBR/MBR system, each MBR tank comprises four MBR modules. In another embodiment of the invention the combined SBR/MBR system, each MBR tank comprises five or more MBR modules.

In one embodiment of the present invention, the combined MBR/SBR system comprises two SBR tanks combined with one MBR tank comprising 3 MBR modules within one tank (as disclosed in FIGS. 2, 5, 8 and 9). In another embodiment the combined MBR/SBR system comprises three SBR tanks combined with one MBR tank comprising three MBR modules. In yet another embodiment of the present invention the combined MBR/SBR system comprises four or more SBR tanks combined with one MBR tank comprising three MBR modules.

In one embodiment of the present invention, the combined SBR/MBR system comprises two SBR tanks combined with one MBR tank comprising one MBR module. In another embodiment of the present invention, the combined SBR/MBR system comprises two SBR tanks combined with one MBR tank comprising two MBR modules. In yet another embodiment of the present invention, the combined SBR/MBR system comprises two SBR tanks combined with one MBR tank comprising four MBR modules. In one embodiment of the present invention, the combined SBR/MBR system comprises two SBR tanks combined with one MBR tank comprising five or more MBR modules.

The combined SBR/MBR system of the present invention can be automatically controlled, using nitrogen and/or ammonia sensor in tank-A 2 and/or tank-B 3.

In one embodiment of the present invention, the combined SBR/MBR system comprises a nitrogen sensor in tank-A 2 of the system. In another embodiment of the present invention, the combined SBR/MBR system comprises a nitrogen sensor in tank-A 2 and tank-B 3 of the system. In yet another embodiment of the present invention, the combined SBR/MBR system comprises a nitrogen sensor in tank-B 3 of the system.

In one embodiment of the present invention, the combined SBR/MBR system comprises an ammonia/ammonium sensor in tank-A 2 of the system. In another embodiment of the present invention, the combined SBR/MBR system comprises an ammonia/ammonium sensor in tank-A 2 and tank-B 3 of the system. In yet another embodiment of the present invention, the combined SBR/MBR system comprises an ammonia/ammonium sensor in tank-B 3 of the system.

In one embodiment of the present invention, the combined SBR/MBR system comprises an ammonia/ammonium sensor and a nitrogen sensor in tank-A 2 of the system. In one embodiment of the present invention, the combined SBR/MBR system comprises an ammonia/ammonium sensor and a nitrogen sensor in tank-B 3 of the system.

In another embodiment of the present invention, the combined SBR/MBR system comprises an ammonia/ammonium sensor in tank-A 2 and a nitrogen sensor in tank-B 3 of the system. In another embodiment of the present invention, the combined SBR/MBR system comprises an ammonia/ammonium sensor in tank-B 3 and a nitrogen sensor in tank-A 2 of the system.

The invention is not limited to the embodiments described above and shown on the drawings, but can be supplemented and modified in any manner within the scope of the invention as defined by the enclosed claims.

The invention claimed is:

1. A wastewater treating system, comprising: at least one sequencing batch reactor (SBR) module for a sequential nitrification and denitrification process, the at least one SBR module comprising a first tank and a second tank; and at least one membrane bioreactor (MBR) module, wherein the at least one SBR module and the at least one MBR module are fluidly connected, and wherein wastewater is fed from the sequential nitrification and denitrification process of the at least one SBR module to the at least one MBR module, wherein the at least one SBR module is further provided with openings connected to a wastewater inlet pipe, said wastewater inlet pipe and openings being arranged in an inlet provided with a control mechanism to control fed flow from the inlet to the openings, and where the openings are connected to the second tank and the first tank, respectively, wherein the first tank further is provided with a first weir interfacing with the at least one MBR module, which first weir is opened and closed by a first closing mechanism, and wherein the second tank is further provided with a second weir interfacing with the at least one MBR module, which second weir is opened and closed by a second closing mechanism, wherein the at least one MBR module includes at least two chambers, each chamber being provided with an opening facing the at least one SBR module and an outlet being in hydraulic connection with the at least two chambers and an outlet pipe extending from the outlet, and wherein in the at least one SBR module there is arranged an opening between the first tank and the second tank through which a flow equivalent to a feed flow is arranged to flow from a tank receiving the feed flow to a tank provided with a closed opening connected with an inlet housing during four phases of the sequential nitrification/denitrification process of a wastewater treatment process; and a MBR channel having a first wall between the MBR channel and the SBR module and a second wall between the MBR channel and MBR module.

2. The wastewater treatment system according to claim 1, wherein the MBR channel is arranged between the first tank and the second tank of the at least one SBR module and the at least two chambers of the at least one MBR module, being in hydraulic connection with outlets of the first tank and the second tank and inlets of the at least two chambers the at least one MBR module and being in hydraulic connection with the first tank and the second tank of the SBR module through the weirs.

3. The wastewater treatment system according to claim 2, further comprising a recyclization pipe which connects both the first tank and the second tank to the at least two chambers of the at least one MBR module.

4. The wastewater treatment system according to claim 1, further comprising a nitrogen or ammonia sensor in the first tank or the second tank.

5. The wastewater treatment system according to claim 1, wherein a number of MBR chambers within the at least one MBR module is more than five.

6. The wastewater treatment system according to claim 2, further comprising a nitrogen or ammonia sensor in the first tank or the second tank.

7. The wastewater treatment system according to claim 3, further comprising a nitrogen or ammonia sensor in the first tank or the second tank.

8. A wastewater treating system, comprising: a sequencing batch reactor (SBR) module for a sequential nitrification and denitrification process, the SBR module comprising a first tank and a second tank; an opening between the first tank and the second tank through which a flow is arranged to flow; a MBR channel having a first wall between the MBR channel and the SBR module, each of the first tank and the second tank having an inlet in the first wall communicating with the MBR channel; at least one membrane bioreactor (MBR) module, the MBR channel having a second wall between the MBR channel and the MBR module, wherein the first tank has a first weir interfacing with the MBR channel, the first weir opened and closed by a first closing mechanism, wherein the second tank has a second weir interfacing with the MBR channel, the second weir opened and closed by a second closing mechanism, and wherein the at least one MBR module includes at least one chamber, the at least one chamber being provided with an inlet in the second wall and an outlet being in hydraulic connection with an outlet pipe.

9. The wastewater treatment system according to claim 8, further comprising an inlet housing, the inlet housing having a pair of opening communication with the first tank and the second tank, respectively.

10. The wastewater treatment system according to claim 8, wherein the at least one chamber of the MBR module comprises three chambers, each of the three chambers having an inlet in the second wall.

11. The wastewater treatment system according to claim 2, wherein the outlets of the first tank and the second tank are in the first wall and the inlets of the at least two chambers of the at least one MBR module are in the second wall.

* * * * *